(12) United States Patent
Brumm et al.

(10) Patent No.: US 6,193,047 B1
(45) Date of Patent: *Feb. 27, 2001

(54) ERGONOMIC WORKSTATION CONVEYOR APPARATUS AND METHOD

(75) Inventors: Christopher A. Brumm, Huntington; Robert E. Liner, Fort Wayne; Christopher L. Cramer, Fort Wayne; Brent R. Howard, Fort Wayne, all of IN (US)

(73) Assignee: Shuttleworth, Inc., Huntington, IN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,723

(22) Filed: May 30, 1997

Related U.S. Application Data

(60) Provisional application No. 60/026,673, filed on Sep. 25, 1996.

(51) Int. Cl.[7] .................................................. B65G 47/00
(52) U.S. Cl. .................................. 198/345.1; 198/345.3; 198/346; 198/860.3
(58) Field of Search ........................... 198/345.1, 345.3, 198/346, 781.05, 781.06, 781.08–781.11, 789, 790, 860.3, 861.1; 193/35 A

(56) References Cited

U.S. PATENT DOCUMENTS

| 2,588,282 | * | 4/1952 | Orwin . | |
|---|---|---|---|---|
| 3,610,406 | | 10/1971 | Fleischauer | 198/127 |
| 3,650,375 | | 3/1972 | Fleischauer et al. | 198/127 R |

(List continued on next page.)

FOREIGN PATENT DOCUMENTS

| 63-97513 | 4/1988 | (JP) | B65G/13/071 |
|---|---|---|---|
| 1-285515 | 11/1989 | (JP) | B65G/13/07 |
| 2-100919 | 4/1990 | (JP) . | |
| 5-338748 | 12/1993 | (JP) . | |
| 8-301439 | 11/1996 | (JP) . | |
| 9-52607 | 2/1997 | (JP) . | |

OTHER PUBLICATIONS

Shuttleworth Spec. Sheet No. H1051 (1993).
Shuttleworth Spec. Sheet No. H1053 (1994).
Shuttleworth Spec. Sheet No. H1054 (1994).
Derwent Publications, English language summary of De 3532725C, 1987.

Primary Examiner—Joseph E. Valenza
(74) Attorney, Agent, or Firm—Woodard, Emhardt, Naughton Moriarty & McNett

(57) ABSTRACT

An apparatus and method for conveying objects to a seated human operator, including a powered conveyor with slippable rollers that is part of a workstation area for the operator. The conveyor is compact enough that a human operator can sit adjacent to it with the operator's legs underneath the moving surface path and perform work on objects being conveyed along the surface path. Also there is a compact driving mechanism for driving the roller shafts. The roller driving and support assemblies are of low vertical height and clear the operator's legs while at the same time maintaining the top surface of the driving and support assemblies and surface path at a comfortable height for the operator's arms. The driving and support assemblies, rollers and roller shafts, and various driving elements provide protection for the human operator. A product stop assembly is also included that stops an object being conveyed along the surface path so that it can be worked on by the human operator. The product stop has a compact vertical height compatible with a workstation.

26 Claims, 15 Drawing Sheets

U.S. PATENT DOCUMENTS

| | | | | |
|---|---|---|---|---|
| 3,696,756 | * | 10/1972 | Elmore et al. | 104/251 |
| 3,917,044 | * | 11/1975 | Brown | 193/40 |
| 3,951,255 | * | 4/1976 | Shuttleworth | 198/127 R |
| 3,961,700 | | 6/1976 | Fleischauer | 198/127 R |
| 4,164,998 | | 8/1979 | DeGood et al. | 198/781 |
| 4,184,579 | | 1/1980 | Kantarian et al. | 193/35 A |
| 4,221,288 | | 9/1980 | Rae | 198/781 |
| 4,314,629 | | 2/1982 | Shilander et al. | 198/500 |
| 4,325,474 | | 4/1982 | Rae | 198/781 |
| 4,355,715 | | 10/1982 | Chorlton | 198/781 |
| 4,366,899 | | 1/1983 | Doro | 198/781 |
| 4,397,386 | * | 8/1983 | Kampf | 198/491 |
| 4,403,688 | | 9/1983 | Livia et al. | |
| 4,406,360 | | 9/1983 | Smith et al. | |
| 4,487,309 | * | 12/1984 | Dorner | 198/491 |
| 4,489,824 | * | 12/1984 | Scourtes | 198/633 |
| 4,687,091 | * | 8/1987 | Sticht | 198/345 |
| 4,703,558 | | 11/1987 | Makinen | 198/346 |
| 4,703,843 | * | 11/1987 | Dixon | 198/345 |
| 4,819,788 | | 4/1989 | Van Der Schie | 198/781 |
| 4,821,866 | | 4/1989 | Melgaard | 198/494 |
| 4,828,466 | | 5/1989 | Lauffer | 414/17 |
| 4,887,707 | | 12/1989 | Harms | 198/781 |
| 4,947,980 | | 8/1990 | Helmstetter | 198/345.3 |
| 5,005,693 | | 4/1991 | Fultz et al. | 198/781 |
| 5,038,923 | | 8/1991 | Evans | 198/781 |
| 5,042,644 | | 8/1991 | Davis | 198/781 |
| 5,070,987 | * | 12/1991 | Koltookian | 198/368 |
| 5,090,558 | | 2/1992 | Hatouchi . | |
| 5,168,976 | * | 12/1992 | Kettleson | 198/345.3 |
| 5,211,276 | * | 5/1993 | Clopton | 198/345.3 |
| 5,392,899 | | 2/1995 | Wakabayashi | 198/780 |
| 5,411,132 | | 5/1995 | Bourgeois | 198/790 |
| 5,472,097 | | 12/1995 | Villachica | 209/546 |
| 5,511,651 | | 4/1996 | Barth | 198/817 |
| 5,558,205 | | 9/1996 | Helgerson et al. | 198/781.04 |
| 5,558,206 | | 9/1996 | Helgerson et al. | 198/781.04 |

* cited by examiner

ERGONOMIC WORKSTATION CONVEYOR APPARATUS AND METHOD

This application claims benefit to United States Provisional Patent Application Ser. No. 60/026,673, filed Sep. 25, 1996.

FIELD OF THE INVENTION

This invention relates to a conveyor apparatus and method for performing work. More particularly, the invention concerns a conveyor of the powered, slippable roller type in which the rollers are individually driven, and which is designed to serve as a workstation at which a human operator sits.

Powered conveyors are used extensively in manufacturing operations to convey objects. The conveyors may be powered or unpowered, and among those that are powered, there are conveyors that are both positively driven and those that are slippable. The latter rely on friction between conveyor elements to propel the objects, and slippage between those same elements to permit the objects to stand still when necessary. Among those conveyors that are slippable, there is a further subdivision between those that have a single roller element spanning the width of the surface path, and those that have multiple roller elements. Examples of powered, slippable roller conveyors are shown in U.S. Pat. No. 3,951,255 issued to J. Shuttleworth and Sprague; 4,053,039 issued to H. Shuttleworth; 4,067,428 issued to H. Shuttleworth; and 5,107,982 issued to Walter; all of these patents are incorporated herein by reference.

The conveyors move the objects to a location where work is performed, such as assembly, test, inspection, or packaging of the objects. This work may be performed by a collection of machines with no need for continual human intervention, or by a human operator that stays at the location more or less full time. Conveyors with multiple slippable rollers are uniquely suited to locations at which a human operator sits and works. The rollers are slippable, and therefore unlikely to pinch or grab the operator's fingers or clothing. The slippable nature of the rollers also makes them ideal for use on products which would otherwise be damaged by non-slippable rollers.

Often such products are removed from a feeder conveyor by a human operator and then placed on a different surface at which the additional work is performed. This additional turning and reaching by the operator places additional stress on the operator, thus lowering his productivity and increasing the manufacturing cost of the product. The use of slippable rollers eliminates the need to transfer the object from the conveyor to the workstation. Instead, the work can be accomplished on the conveyor. In the latter situation, it is desirable that the location be setup as an ergonomically designed workstation, minimizing non-productive tasks and improving productivity.

Ergonomic design techniques include incorporating anthropometric criteria into the layout of the location. This anthropometric data includes statistically based measurements of various aspects of the human body. Examples of this criteria and data can be found in ANSI/HFS Standard No. 100-1988 published by the Human Factors Society of Santa Monica, Calif.; the IAC Workstation Adjustment Calculator Wheel made by IAC Industries of Brea, Calif.; *Evaluation of human work* by Wilson and Corlett and published by Taylor & Francis; and *Designing for Human: The Human Factor in Engineering* by Burgess and published by Petrocelli Books; all of these references are incorporated herein by reference.

With knowledge of anthropometric measurements, an area can be designed in which the human sits comfortably and safely, with the objects situated well within his reach. The following is an example of the range and type of anthropometric data that can be incorporated into this workstation:

| Dimension | 5th % Female (inches) | 95th % Male (inches) |
| --- | --- | --- |
| working/elbow height | 20.8 | 29.5 |
| seat height | 13.8 | 18.8 |
| minimum thigh clearance | 19.4 | 26.2 |
| functional horizontal reach | 24.9 | 32.0 |
| optimum horizontal work envelope | 11.8 | 15.4 |
| minimum horizontal knee clearance (from edge of conveyor) | 12.8 | 15.8 |
| minimum horizontal toe clearance (from edge of conveyor) | 19.6 | 24.7 |

For applications where the conveyor surface is used as the work surface, the vertical height of the conveyor should be adjustable to permit raising the conveyor for taller workers and lowering the conveyor for shorter workers. This type of ergonomic data is useful accommodating a range of people.

What is needed is an improved conveyor incorporating ergonomic concepts.

SUMMARY OF THE INVENTION

Briefly describing one aspect of the present invention, there is provided a method for a human operator to work on objects. The method includes providing a powered conveyor with a plurality of roller shafts and a plurality of slippable rollers on some of the roller shafts. The rollers define a surface path along which the objects are conveyed. A portion of the driving and support assemblies of the conveyor are enclosed for the protection of a human operator sitting with legs underneath the surface path. The operator sits adjacent to the conveyor with a portion of the operator's legs being underneath the surface path. The operator can safely and comfortably sit adjacent the conveyor, reach onto the surface path, and perform work on an object.

Another aspect of the present invention concerns an apparatus for conveying objects, the apparatus being within a workstation for a human operator. The apparatus comprises a plurality of roller shafts and a plurality of slippable rollers driven by said roller shafts, the rollers defining a surface path along which objects are conveyed. The conveyor includes a driving mechanism for driving the roller shafts. There is also a first enclosure of the driving mechanism for protection of the human operator. A roller shaft support assembly rotatably receives the roller shafts. There is a second enclosure for the support assembly for protection of the human operator. Another aspect of the present invention concerns a product stop assembly for stopping an object on the surface path within the workstation area.

It is an object of the present invention to provide a method of working on objects conveyed by a powered conveyor with slippable rollers such that the human operator can sit adjacent the conveyor and perform work on the objects conveyed.

It is another object of the present invention to provide a powered conveyor with slippable rollers that is of compact vertical height from the bottom surfaces of the conveyor to the top surfaces of the conveyor.

It is another object of the present invention to enclose the driving and support assemblies of the conveyor so that a human operator sitting in proximity to the conveyor is protected from harm.

These and other objects of the present invention will become apparent from the description of the preferred embodiments and the claims.

DESCRIPTION OF THE PREFERRED EMBODIMENT

Figure 1:
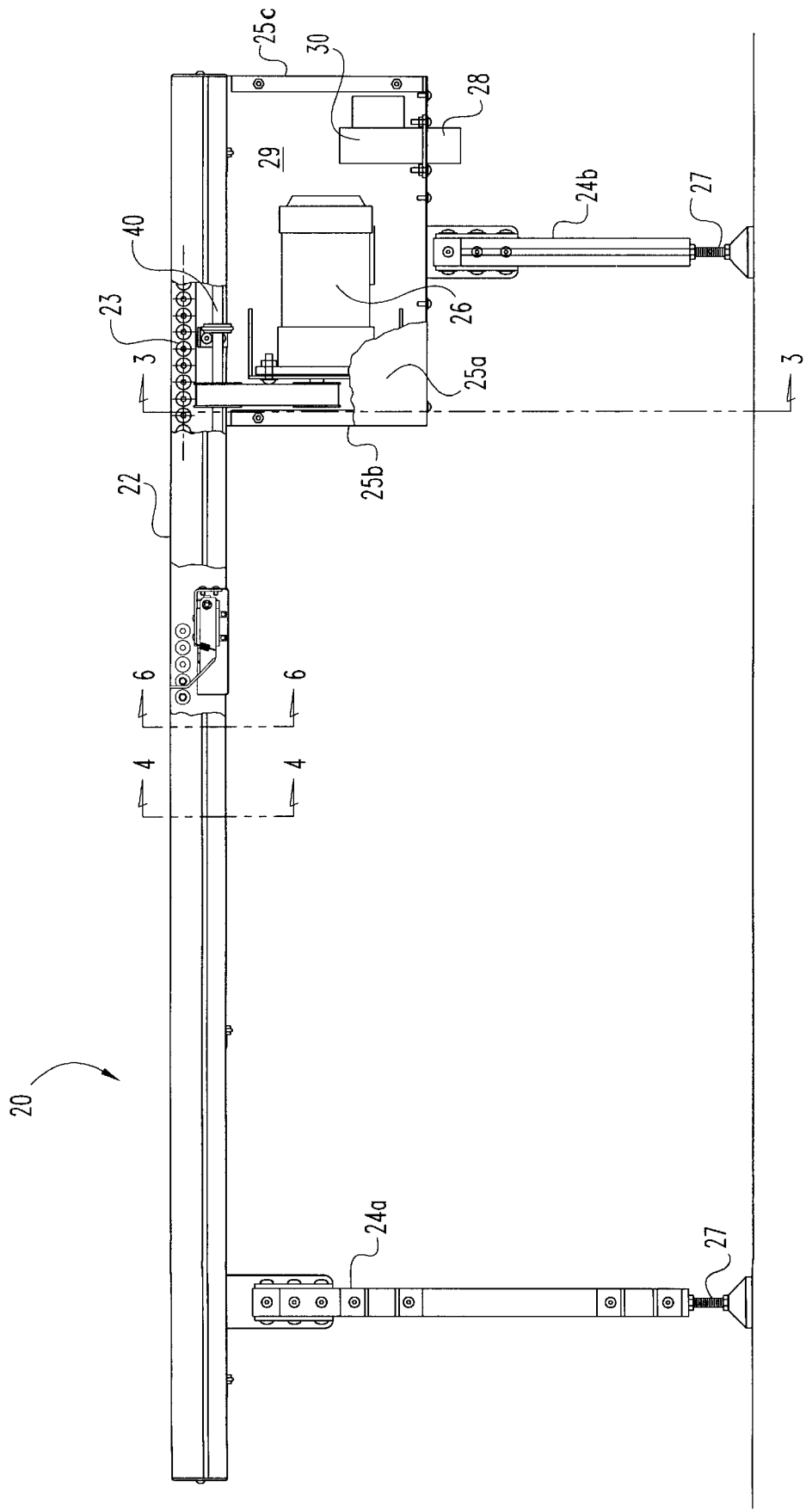
FIG. 1 is a side view of the first embodiment of the present invention, with some covers partially cut away and some portions in sectional view.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to a powered conveyor with slippable rollers that is part of a workstation area for a human operator. The conveyor is compact enough that a human operator can sit adjacent to roller driving assembly 45 or 145 or roller support assembly 49 with the operator's legs underneath the moving surface path and perform work on objects being conveyed along the surface path. The low vertical height of the driving and support assemblies permit the bottom surface of the driving or support assembly to clear the operator's legs while at the same time maintaining the top surface of the driving and support assemblies, and surface path 23 also, at a comfortable height for the operator's arms. The driving and support assemblies, rollers and roller shafts, and various driving elements provide protection for the human operator. It is possible to include all of these ergonomic features throughout the entire conveyor apparatus. However, it is also possible that these ergonomic features be incorporated in only a portion of the conveyor apparatus.

The present invention achieves a new functional relationship in which a conveyor with powered slippable rollers is incorporated into a workstation for a sitting human operator. Side rail members 46, 50, and 146 of the driving and support assemblies are of low overall height and low overall width so as to be ergonomically acceptable. The side rail members are large enough for standard fastener hardware, strong enough and stiff enough to support a variety of objects, and lightweight enough to permit the conveyor apparatus to be useful in a variety of locations.

Also there is a compact driving mechanism for driving the roller shafts. The distance from the centerline of the roller shafts to the centerline of the drive shaft is greatly reduced. In addition, the diameter of the drive shaft is reduced so that its bearings and bearing supports are smaller. This reduction in diameter also makes the drive shaft lighter and reduces the weight supported by the side rail. However, this reduction in drive shaft diameter changes the speed ratio relative to the roller shafts, thus increasing wear of the drive belts. Drive belt durometer and tension had to be changed to compensate for the wear. Reduction in the diameter of the drive shaft decreases the stiffness of the drive shaft, resulting in variation in belt wear. The more flexible drive shaft bends away from the bearing mounts, and thus belts located away from the mounts have less tension and less wear than belts near the mounts. Similarly, belts located away from the mounts have less drive capacity than belts near the mounts. An increased number of mount assemblies compensates for this bending.

The alternative embodiments depicted and described include a product stop assembly that stops an object being conveyed along the surface path so that it can be worked on by the human operator. The product stop is arranged to fit within anthropometric standards and be part of the workstation area. Many product stops known to those of ordinary skill in the art extend vertically and would interfere with the workstation area. The product stop of the present invention is arranged in horizontal fashion underneath the surface path, having a compact vertical height compatible with a workstation.

FIGS. 1–8 depict various aspects of a conveyor assembly 20 incorporating a first embodiment of the present invention. Conveying roller assembly 22, panels 25a–d, and the components within panels 25 are supported from the floor surface by leg assemblies 24a and 24b. Leg adjusters 27 are incorporated into the ends of legs 24a and 24b. Legs 24 are shown in sectional view. With adjusters 27, the height of surface path 23 above the floor line can be adjusted. The generally planar surface path 23 extends along the tops of rollers 52. The height of surface path 23 can be adjusted from a range of 18.8 inches to accommodate a height two inches below the working height for 5th percentile females to 31.5 inches to accommodate a working height two inches above the working height for 95th percentile males. Note that these dimensions are for 5th percentile female and 95th percentile male operators with seat heights of 13.8 and 18.8 inches, respectively. Operators sitting on chairs with extended legs would require similar extensions in length to legs 24.

Leg assembly 24b supports electric motor 26, blower evacuator 30, and exhaust nozzle 28, which are contained within panels 25a, 25b, 25c, and 25d. The size and placement of motor 26 restricts the permissible workstation area by reducing leg room underneath the conveying surface. For that reason, panels 25 form closely to the mechanisms enclosed therein. Panels 25 comprise an assembly of panels, seals, and fasteners that form a portion of confined volume 29 with little air leakage. Blower evacuator 30 pulls air into and out of this portion of volume 29 for internal retention and exhausting of particles and dirt and also for cooling of motor 26. Exhaust nozzle 28 can be attached to additional air ducting (not shown) to remove any matter gathered by evacuator 30 to an area away from the workstation. Panels 25 may include stiffening features or sound-deadening material so as to keep the workstation area quiet.

The fasteners that attach together the various metal panels and seals of panels 25, as well as other fasteners depicted in the figures, should have smooth heads and otherwise rounded features in the vicinity of the workstation area. Button head fasteners are used in all embodiments described herein. Fasteners of this type minimize cuts and abrasions to human operators working in close proximity to apparatus 20.

Figure 2:
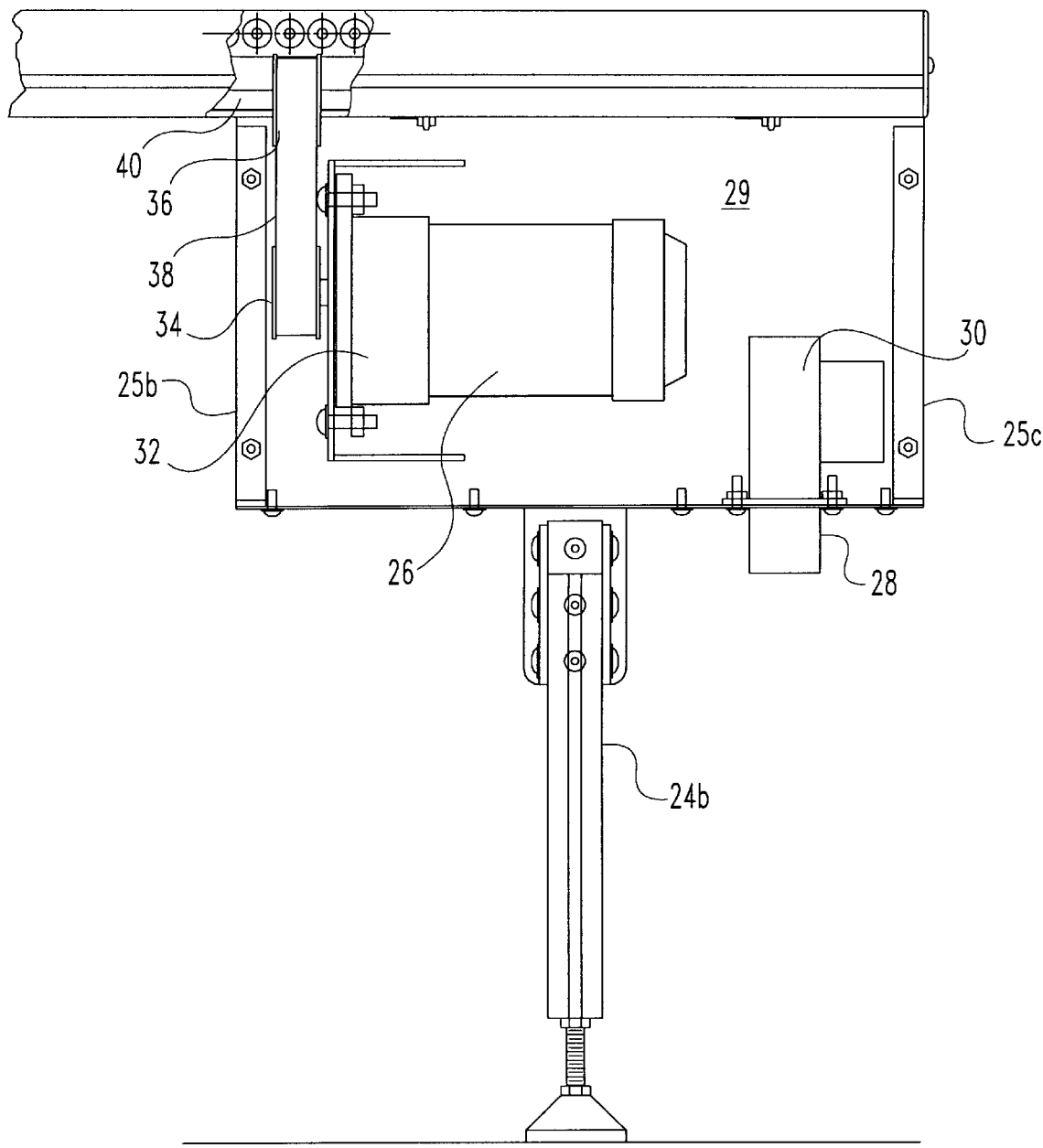
FIG. 2 is an enlarged view of FIG. 1 in the vicinity of the motor.

FIG. 2 is a portion of FIG. 1 in the vicinity of motor 26. Attached at the drive side of motor 26 is gear reducer 32, which reduces the output speed of motor 26. The output of reducer 32 drives timing belt sprocket 34, which in turn drives timing belt sprocket 36 through timing belt 38. Sprocket 34, sprocket 36, and timing belt 38 have a driving width of approximately 25 mm. For example, sprocket 34 is a Dodge model #112487-P48-5M-25-1210, which is held onto the output shaft of reducer 32 by a Dodge #1210, 0.750 inch bore taper lock bushing. Sprocket 36 is a Dodge Model #112483-P36-5M-25-1108, which is keyed to drive shaft 40 by a Dodge #1108, 17 mm bore taper lock bushing. Although specific sprockets have been described, the present invention includes equivalent driving structure known to those of ordinary skill in the art.

Figure 3:
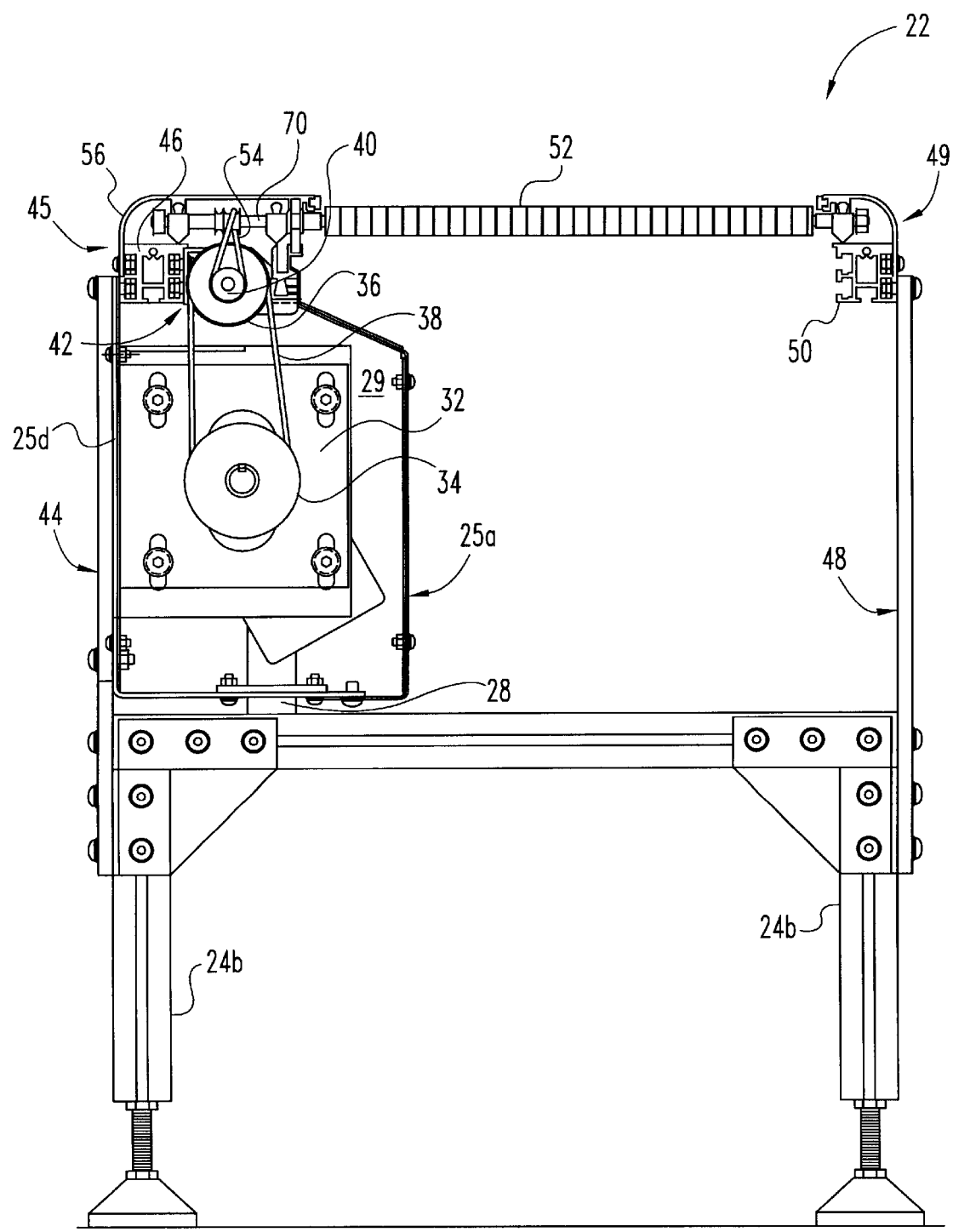
FIG. 3 is a view of FIG. 1 taken along line 3—3.
Figure 4:
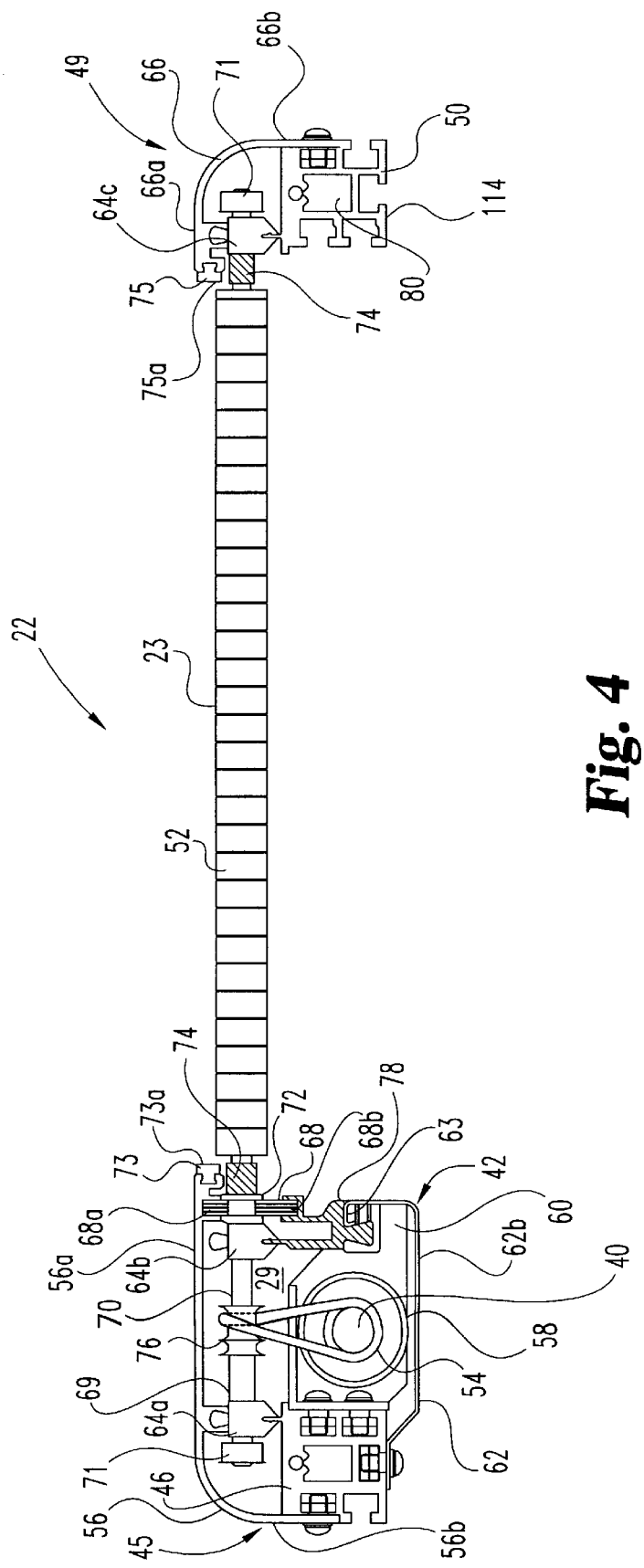
FIG. 4 is a view of FIG. 1 taken along line 4—4, showing conveying assembly 22.

FIG. 3 is a cross-sectional view of FIG. 1 taken along line 3—3. FIG. 4 is a view of FIG. 1 taken along line 4—4, showing conveying assembly 22. Legs 24b provide support for leg support plates 44 and 48. Mounted at the top of plates 44 and 48 is conveying roller assembly 22. Assembly 22 comprises roller shaft driving assembly 45 and roller shaft support assembly 49, which rotatably support a plurality of roller shafts 70. Sprocket 36 is keyed to and drives shaft 40. Shaft 40 is supported by bearings 58 within mount assemblies 42. Bearing mount assemblies 42 are supported by side rail member 46. For ease of manufacturing and low overall cost, side rail members 46 and 50 are identical. However, it would be possible to further reduce the size of side rail member 50 since it does not bear the loads of drive shaft 40, motor 26, or other drive mechanism devices. Members 46 and 50 are of sufficient vertical stiffness to provide support along the length of conveyor apparatus 20, yet have low overall height to permit a compact packaging of all components, such that an operator can comfortably and safely put the operator's legs underneath surface path 23. Further, members 46 and 50 are narrow enough to permit an operator to reach over member 46 or 50 in order to grasp an object being conveyed along surface path 23. Members 46 and 50 are also light enough to not deflect significantly under their own weight. Deflection of members 46 and 50 imparts deflection into drive shaft 40. Excessive deflection of drive shaft 40 leads to improper loading and increased wear of drive belts 38 and 54.

Figure 5:
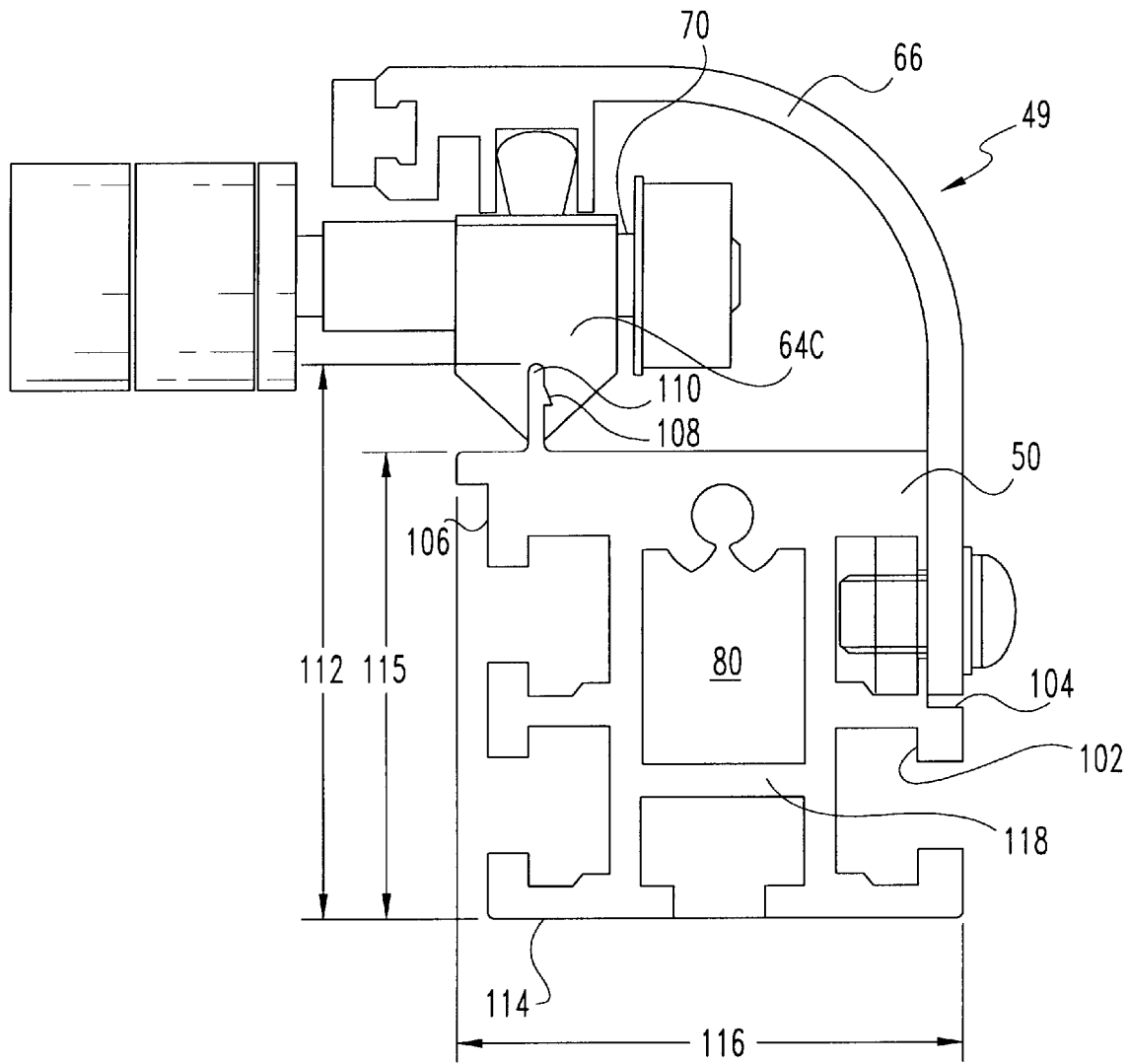
FIG. 5 is an enlarged view of FIG. 4 in the vicinity of side rail member 50.

Members 46 and 50 are extruded from aluminum, although other fabrication methods and other materials may be acceptable. Member 50 is shown in FIG. 5. Member 50 includes features 102 which retains portions of various fasteners used to attach different components to member 50. Features 102 are shown on three sides of member 50. Member 50 also includes recess 104 which permits location and flush mounting of cover 66. Recess 106 permits location and mounting of bearing mount assemblies 42 when member 50 is used in driving assembly 45 on the drive side of apparatus 20 as member 46.

Side member 50 supports roller shaft 70 via bushing holder 64C. Holder 64C includes locating feature 108, which is complementary in shape to locating feature 110 protruding from the length of member 50. Member 50 has a height 112 from feature 110 to bottom surface 114 of approximately two inches (52 mm) and from surface 115 to surface 114 of approximately 1.7 inches (44 mm). Member 50 has a width 116 of approximately 1.9 inches (48 mm). Side member 50 includes void 80, which is enclosed along the bottom by feature 118 Void 80 is useful in reducing the overall weight of member 50. A small round feature incorporated into void 80 may be threaded at the ends of the member to receive a fastener. Side member 50 has a weight of approximately 1.5 pounds per lineal foot along the length of member 50. Feature 118 closes off a portion of void 80, and assists in making member 50 lightweight, stiff and strong. Member 50 is designed to minimize deflection of the conveyor yet still be extrudable.

Bearing mount assemblies 42 support drive shaft 40 from side member 46. Assemblies 42 include bearing mount 60 which fastens to member 46, and which receives in a semi-circular pocket roller bearing 58. Bearing 58 is a roller bearing such as AMI #BR3-SNR. It has an approximate 0.7 inch (17 mm) inner diameter which receives the approximate 17 mm outer diameter of drive shaft 40. Proper selection of the outer diameter of drive shaft 40 has an effect on the weight, dimensions, and reliability of apparatus 20. If the outer diameter is too large, then the outer diameter of bearing 58 increases, the overall vertical height of bearing mount 60 increases, and the weight of mount 60, bearing 58 and drive shaft 40 all increase. Support of increased weight would result in a need for an increase in stiffness and strength of member 46, which would increase the overall height of driving assembly 45. As the overall vertical height of driving assembly 45 increases, it becomes less comfortable and more unsuitable for a human operator sitting in close proximity to apparatus 20.

The diameter of shaft 40 is approximately 17 mm, although diameters as large as one inch (25 mm) are acceptable. This reduction in size decreased the bending stiffness of shaft 40. Previous noncompact designs, using stiffer drive shafts, included an equivalent to mount assembly 42 placed approximately every 39 inches (1 meter). If this same spacing of mount assembly 42 were included in the present invention, excessive bending would result. Mounts 42 are located approximately every 16 to 24 inches (400 to 600 mm), although different spacing may be necessary near the end of apparatus 20 or near motor 26.

Situated above and generally perpendicular to drive shaft 40 are roller shafts 70. The diameter of roller shafts 70 is approximately 8 mm, although shafts as large as 11 mm are adequate. Shafts 70 are supported by bushings within bushing holders 64. Holders 64a and 64b rotatably support shaft 70 on either side of drive shaft 40 within driving assembly 45. Holder 64c supports shaft 70 at its other end within support assembly 49. Holder 64c is supported on locating feature 110 and in a similar manner holder 64a is supported by member 46. Holder 64b is supported on a similar locating feature incorporated into mount rail 78. Rail 78 extends for the approximate length of apparatus 20, and is supported by a pocket within mount 60.

Pulley 76 is located between holders 64a and 64b, and surrounds and is attached to roller shaft 70. A plurality of drive belts 54 are wrapped around the outer diameter of drive shaft 40 for driving roller shafts 70. The driving diameter of pulley 76 is approximately 0.7 inches (17 mm). Because of the decreased distance from shaft 40 to shafts 70, there was a tendency for belt 54 to climb out of the groove of pulley 76. As a result of this problem, the width of pulley 76 was increased to approximately one half inch (13 mm) from a previous value of ¼ inch (6 mm).

In order to make driving assembly 45 compact vertically, drive shaft 40 is closely spaced to roller shafts 70. The close spacing of drive shaft 40 to roller shaft 70 can lead to excessive wear of drive belts 54. The distance from the centerline of drive shaft 40 to the centerline of roller shaft 70 is approximately 47 mm, although distances as large as about two and two thirds inches (68 mm) are considered adequate. The close spacing of shaft 40 relative to shaft 70 increases the wear of belts 54. The ratio of the diameter of shaft 40 to the drive diameter of pulley 76 establishes the speed ratio between the two shafts to be approximately 1:1.31, with shafts 70 spinning 31% faster than shaft 40. This relatively low speed ratio increases wear on belts 54. To compensate for the different aspects of this invention that cause increased wear of belts 54, it is necessary to provide proper characteristics of belts 54 to insure reliable operation.

Belts 54 are made from a urethane material. The overall length of belt 54 is approximately 143 to 145 mm, although to accommodate larger drive shafts and roller shafts a belt length of about six and one half inches (166 mm) is adequate. The durometer of belts 54 is approximately 80 to 90. When belts 54 are installed, each belt is under tension of approximately 3.4 pounds. Belts 54 wrap around the outer diameter of shaft 40, are twisted 90°, and then wrap around pulleys 76 as depicted in FIG. 4. However, in some locations, the direct drive of roller pulley 76 from drive shaft 40 is not possible. In those cases, a toothed belt provides power transfer between adjacent toothed belt sprockets 71. Spacer 69 is inserted between holder 64a and pulley 76 to ensure the correct location of pulley 76 relative to shaft 40.

A plurality of rollers 52 are assembled on roller shaft 70. Objects are moved along surface path 23, which extends along the tops of rollers 52. These rollers are frictionally driven as described in U.S. Pat. No. 3,951,255 to J. Shuttleworth, et al., incorporated herein by reference. These rollers are individually driven by and slippable upon roller shaft 70. The ability of rollers 52 to individually slip is an important feature in an ergonomically designed conveyor. If a portion of the operator's clothes or extremities becomes lodged between rollers 52, the rollers slip and stop rotating or pinching.

The ability of rollers 52 to slip contributes to the ergonomic design of apparatus 20 in yet another way. As objects move along surface path 23, and pass in front of a human operator, the object can be stopped and worked upon by the operator while the object is still in contact with rollers 52. Stoppage of the object causes those rollers in contact with it to also stop, thus preventing wear on the object. Because of the ability of rollers 52 to slip, it is not necessary to depower motor 26 or use clutching mechanisms to stop roller shafts 70 located within the workstation area.

Pulley cover 56 attaches by fasteners to side member 46 and is received within feature 104. Bushing cover 66 is fastened to side member 50, and is received within recess feature 104 of member 50. Both cover 56 and 66 have outer surfaces that are approximately flush with the outer surface of member 46 and 50, respectively. Covers 56 and 66 include pockets that receive the tops of holders 64a and 64c, respectively, although it is possible the holders could be received by structure other than the covers. Covers 56 and 66 cover the tops and outward sides of driving assembly 45 and support assembly 49, respectively, preventing extremities or clothing of the human operator from coming in contact with the various internal mechanisms. The outer surfaces of covers 56 and 66 are smooth, and rounded where possible. Surfaces 56a and 66a are the topmost features of driving assembly 45 and support assembly 49, respectively, and are surfaces which could come into contact with the arms or other upper surfaces of the human operator.

Bottom cover 62 is fastened to member 46, and is inserted between mount 60 and mount rail 78 along inner edge 63. Mount rail 78 and cover 62 extend along the workstation area of apparatus 20. Cover 62 and mount rail 78 prevent loose objects, clothing, or extremities of the operator from coming into contact with shaft 40, belts 54, and pulleys 76 within the workstation area. Cover 62 is smooth and has rounded edges where possible. Bottom surface 62b of cover 62 and surface 114 of member 50 are the bottommost surfaces of driving assembly 45 and support assembly 49, respectively, and could come into contact with the legs or lower portions of the human operator.

The vertical height from top surface 66a to bottom surface 114, and from top surface 56a to bottom surface 62b are important in ergonomically sizing conveyor apparatus 20 within the workstation area. The bottom surfaces 62b and 114 are high enough to provide adequate leg clearance for the human operator. Top surfaces 56a and 66a are low enough to not interfere with the arm or upper body movements of the operator. A vertical height between top and bottom surfaces of about four inches (101 mm) or less is considered adequate, maintaining both adequate ergonomic clearance while permitting the various elements of conveyor apparatus 20 to be sufficiently strong, stiff, and durable. However, lesser vertical heights are desirable if apparatus 20 is to be used for both 5th percentile females and 95th percentile males. The vertical height from surface 56a to surface 62b is about three and two thirds inches (93 mm), and the vertical height from surface 114 to surface 66a is about three and one eighth inches (80 mm). Because of the smaller overall vertical height of support assembly 49, it is the preferable side at which the human operator sits.

The present invention includes a first enclosure of the driving mechanism and a second enclosure of support assembly 49. Both enclosures protect the human operator by enclosing those mechanisms that could pinch, abrade, grab or otherwise bring damage or injury to the clothing, tools, or extremities of the operator.

The first enclosure includes within it a driving mechanism for the slippable rollers. The driving mechanism includes motor 26, gear reducer 32, sprockets 34 and 36, drive belts 38 and 54, pulleys 76, drive shaft 40, and roller shafts 70. Although specific features of the driving mechanism are described, the present invention includes equivalents known to those of ordinary skill in the art.

Within the workstation area of apparatus 20, the human operator is protected from the driving mechanism by the first enclosure, which includes cover 56, member 46, cover 62, rail 78, and seal 68. The first enclosure extends for the length of the workstation area, and does not present openings through which the operator is exposed to moving parts. The outward surfaces of the first enclosure are smooth, and where possible are rounded. It is possible that all portions of the driving mechanism are not enclosed. For example, the motor need not be enclosed for the purpose of protecting the operator if the workstation is sufficiently far from the motor to minimize the chance harmful or damaging contact, or if the motor is otherwise enclosed. Although specific elements of the first enclosure are shown, there are equivalents to the first enclosure known to those of ordinary skill in the art. For example, covers 56 and 62 could be made to complete enclose member 46, or covers 62 and 56 could each be made in multiple pieces.

Support assembly 49 includes a second enclosure for protection of the human operator. The second enclosure includes cover 66, and member 50. The outward surfaces of the second enclosure are smooth, and where possible are rounded. The second enclosure protects the human operator from rotating elements such sprocket 71 and the end of shaft 70. There are equivalent structures that would also protect the operator from the rotating elements of support assembly 49, including a cover that would attach differently to side member 50, or a multiple piece cover. Between the first enclosure and the second enclosure are rollers 52 and spacers 74. These rollers and spacers are slippable on shaft 70 and thus do not present a hazard to the extremities, tools, or clothing of the operator.

Guide rails 73 and 75 are located along surface path 23. A first guide rail 73 is received within a complementary pocket of cover 56. A second guide rail 75 is similarly received within a pocket of cover 66. Faces 73a and 75a are the respective boundaries of surface path 23a. Objects being conveyed along surface path 23 may come into contact with and slide along faces 73a or 75a of guide rails 73 or 75. Rails 73 and 75 act as guides for the objects conveyed. Those of ordinary skill in the art will recognize structure other than rails that will serve as guides for the conveyed objects.

The horizontal distances from outer surface 66b to face 75a and from outer surface 56b to face 73a are the distances over which an operator reaches in order to perform work on an object being conveyed along surface path 23. A horizontal distance of less than about six and one third inches (160 mm) is adequate. The horizontal distance from surface 56b to surface 73a is approximately five and two thirds inches (143 mm). The horizontal distance from surface 66b to surface 75a is approximately two and one third inches (60 mm). An operator sitting adjacent to support assembly 49 would have a distance of about 60 mm over which to reach surface path 23. An operator sitting adjacent to driving assembly 45 would have a distance of 143 mm over which to reach, but would have surface 56a to support his arms, tools and other equipment.

Figure 9:
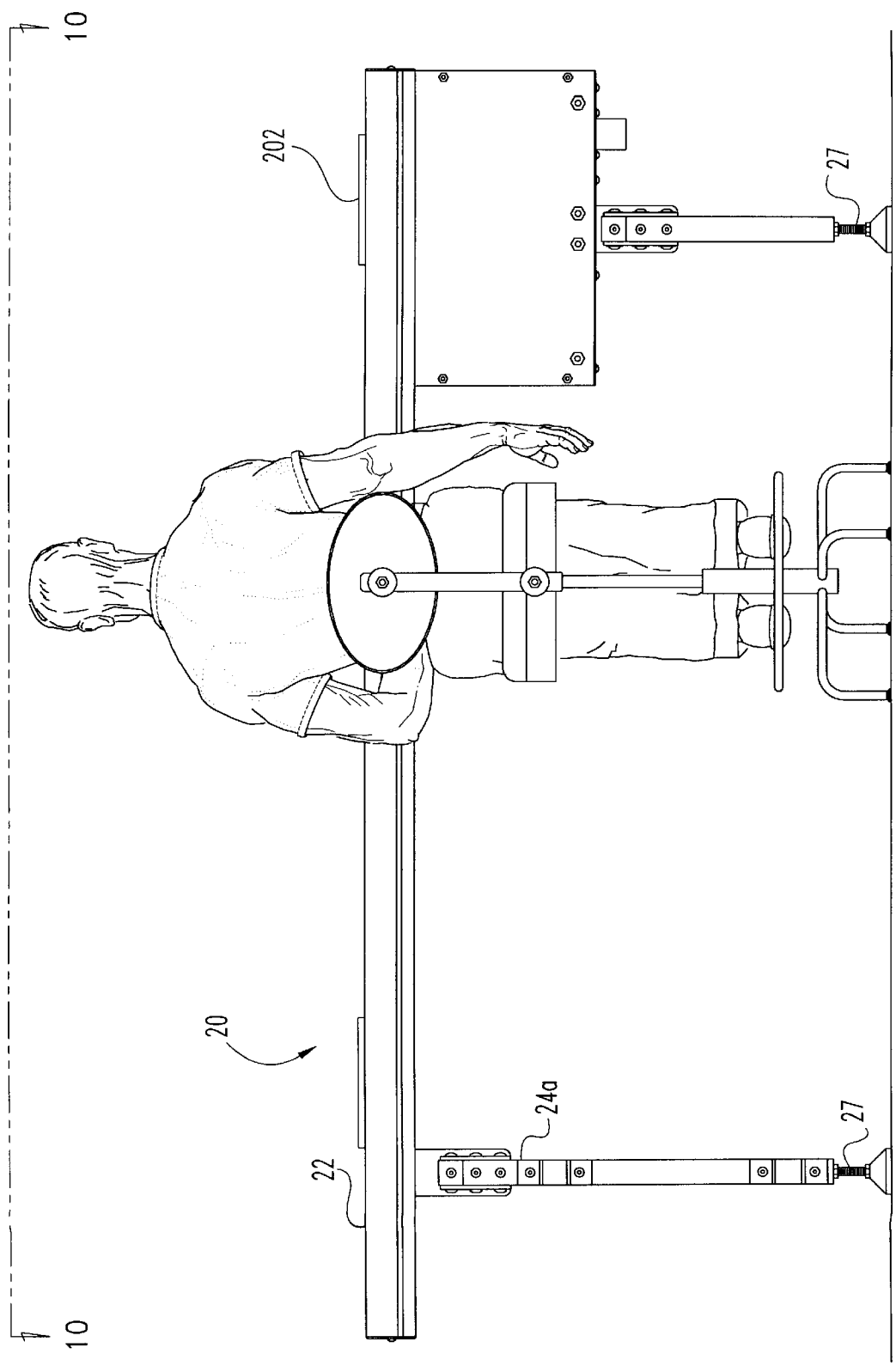
FIG. 9 is a view of the first embodiment of the present invention showing a human operator sitting at a workstation.
Figure 10:
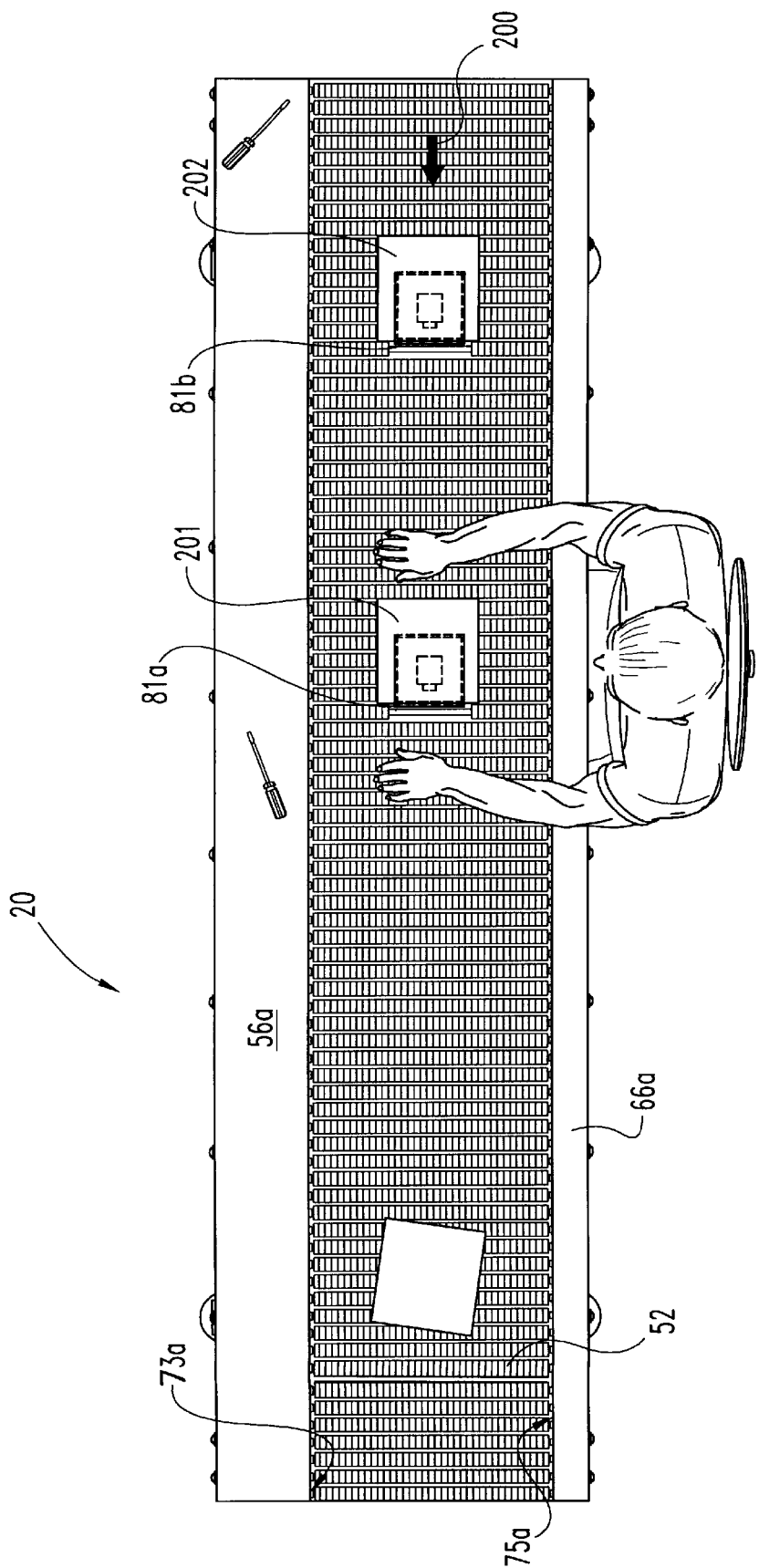
FIG. 10 is a view of FIG. 9 taken along line 10—10.

FIGS. 9 and 10 depict a human operator sitting at a workstation that incorporates apparatus 20. Objects are conveyed along surface path 23 in the direction of arrow 200. A first object 201 has been stopped in front of the operator and within the reach of the operator by product stop assembly 81a. A second object 202 has been stopped upstream of the operator by a second product stop 81b. A portion of the operator's legs are underneath boundary 75a and surface path 23. Top surface 66a is underneath the operator's arms and bottom surface 114 is above the operator's legs. It is also possible that the operator sit adjacent the other side of apparatus 20, reaching over boundary 73a to perform work on products stopped along rollers 52.

Because of the slippable design of rollers 52, the operator is not required to transfer the object from the conveyor to a separate workstation in order to perform work on the object. Also, it is not necessary to depower the conveyor while the work is being performed. If the operator chooses, the object can remain in contact with rollers 52 while work such as assembling, testing, packaging, inspecting, or other work is being performed. The rollers slip without harming the object or the operator.

Conveyor apparatus 20 also includes elements that make it suitable for an environment in which it is important that there be little particulate matter in the atmosphere, such as a clean room. Spool seal 72 rotatably receives within it roller shaft 70, and adjoins static seal 68. Seal 68 comprises a top half 68a which adjoins the top half of spool seal 72 and is received within a pocket of cover 56. Bottom half 68b adjoins the bottom half of spool seal 72 and is received within a pocket of rail 78. Seals 68a and 68b run approximately the length of conveyor apparatus 20 and present a restriction to air attempting to flow into confined volume 29. Seals 68a and 68b are resilient, and are manufactured from a foamed synthetic material. Spacer 74 is rotatably received over shaft 70. Along driving assembly 45, spacer 74 lies between spool seal 72 and a roller 52. Along support assembly 49, spacer 74 lies between holder 64c and slippable roller 52. Spacers 74 prevent excess axial motion of rollers 52.

Confined volume 29 includes within it those components that comprise the driving mechanism for the slippable rollers. Confined volume 29 includes many of the elements of apparatus 20 that generate particulate matter. As shown in FIG. 4, covers 56 and 62, member 46, rail 78, and seals 68 and 72 form a portion of confined volume 29 in the vicinity of the power transferred from shaft 40 to shafts 70. This portion of confined volume 29 is in fluid communication with that portion of confined volume 29 depicted in FIGS. 2 and 3 and within panels 25. Evacuator 30 causes a reduction in air pressure within confined volume 29, thus causing any particulates formed within volume 29 to either stay within volume 29 or be evacuated through nozzle 28. It is also possible to have an external manner of reducing air pressure within volume 29 as a substitute for evacuator 30. This external source would be fluidly coupled to exhaust nozzle 28.

Although the first embodiment shows specific elements used to make confined volume 29, it would be possible for confined volume 29 to have fewer or greater elements, provided that leakage of air into volume 29 is low enough that evacuator 30 is capable of maintaining particulates within the confined volume. For example, seals 72 and 68 could be replaced with other types of seals known within the art and covers 56 and 62 could be made to completely enclose member 46. Also, although the first embodiment of the invention includes the seals, panels, evacuators, and other elements that make it compatible with a clean room, it is not necessary to have these elements.

Figure 6:
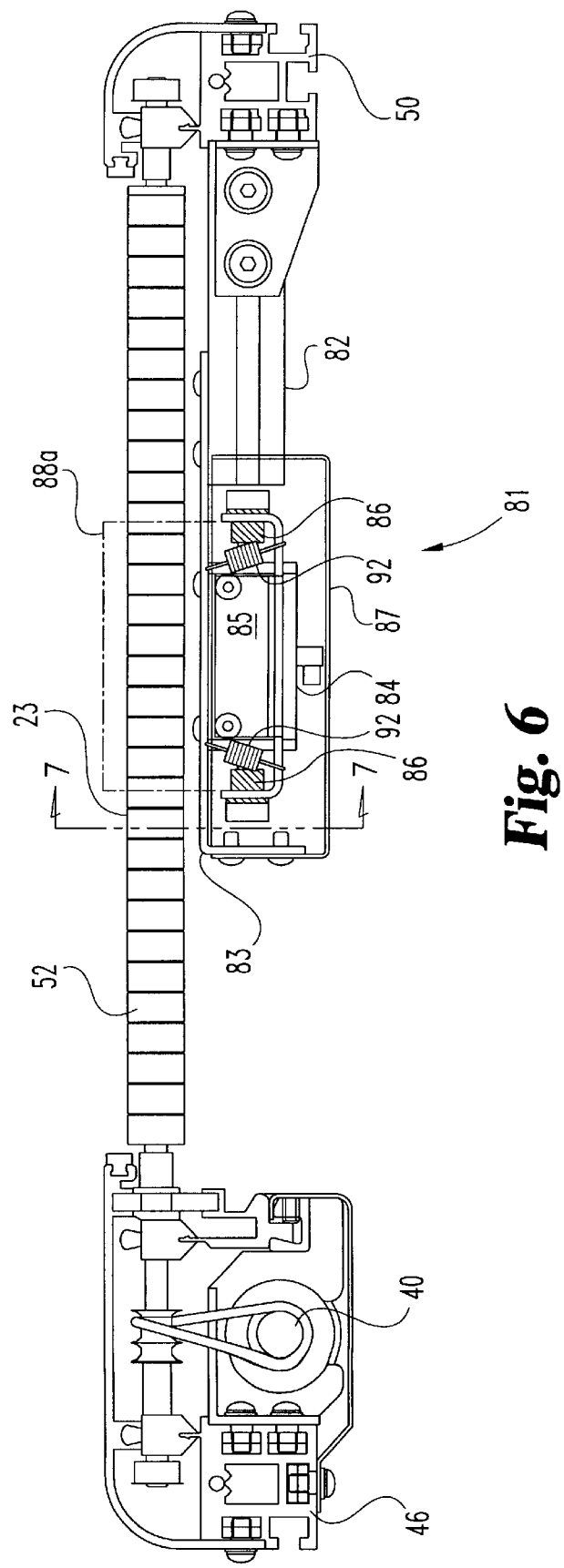
FIG. 6 is a view of FIG. 1, taken along line 6—6.
Figure 7:
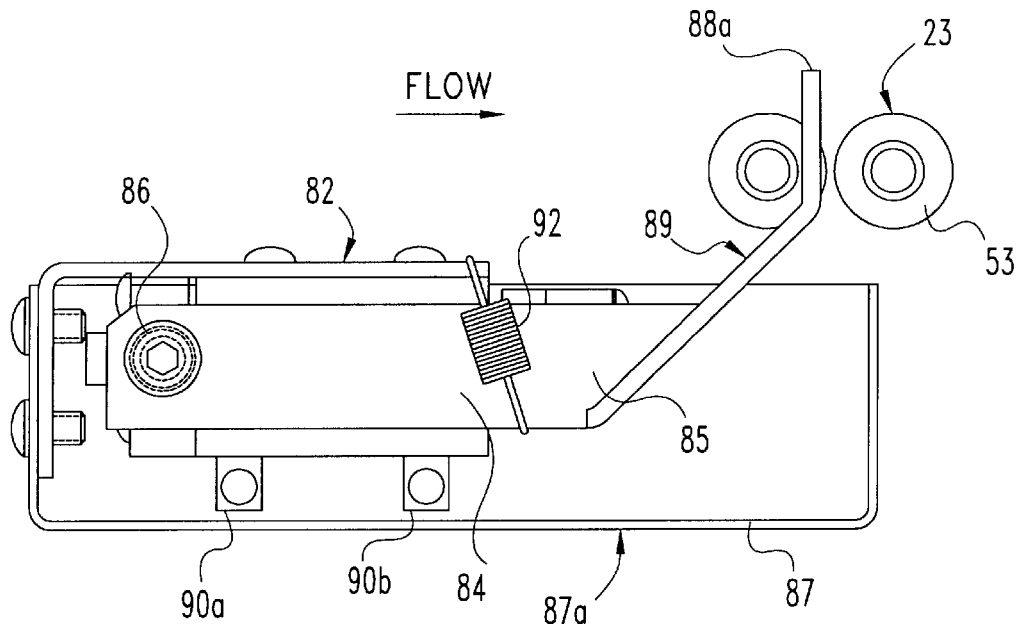
FIG. 7 is a view of product stop assembly 81 taken along line 7—7 of FIG. 6.
Figure 8:
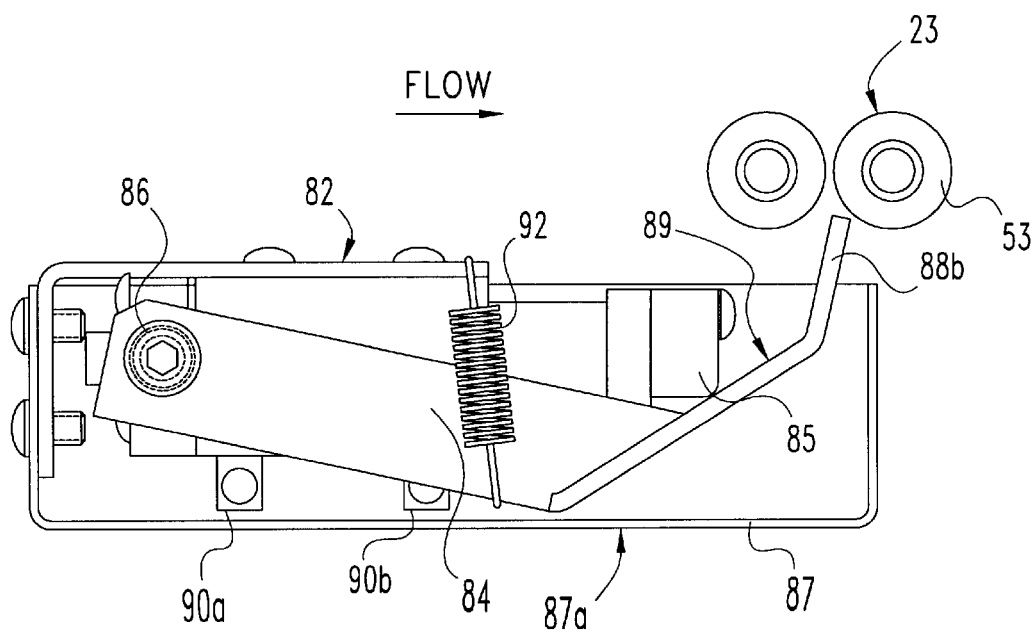
FIG. 8 is a view of the product stop assembly of FIG. 7, with the stop plate 88 in the downward position.

FIGS. 6–8 depict the preferred embodiment of a product stop assembly 81 useful with the present invention. Assembly 81 is rigidly attached to side rail 50 by support structure comprising lateral support 82 fastened to side rail 50, and top support 83 fastened to lateral support 82. Fastened to support 83 is air cylinder 84, arranged such that member 85 fastened to the piston of air cylinder 84 actuates in a direction generally parallel to the flow of objects along surface path 23. Air cylinder 84 is located below surface path 23. Attached pivotally to air cylinder 84 are bushings 86 which support product stop plate 88. Stop plate 88 is rotatable to an upward position 88a which stops objects moving along surface path 23 and downward position 88b which does not stop objects moving along path 23.

In the preferred embodiment of the product stop, the axis of rotation of product stop plate 88 is through bushings 86 is on the end of air cylinder 84 generally opposite the end to which member 85 is attached. Springs 92 are attached to both product stop plate 88 and top support member 82 so as to urge stop plate 88 in the upward direction.

Air cylinder 84 is a pneumatic actuator with an extended position as shown in FIG. 8 and a retracted position as shown in FIG. 7. Member 85 actuates to the extended and retracted positions by application of air pressure to ports 90a and 90b. In FIG. 8, member 85 is actuated to the extended position, causing bumper 85 to press against surface 89 of product top 88. Because of the inclination of surface 89 relative to the line of motion of member 85, stop 88 is pushed to downward position 88b, rotating about bushings 86 to a position below surface path 23. Retraction of member 85 by air cylinder 84, as shown in FIG. 7, permits springs 92 to urge product stop 88 upward, until stop 88 rotates to position 88a with a portion of stop 88 above surface path 23. As shown in FIG. 7, stop 88 in position 88a causes an object moving along path 23 to stop. As shown in FIG. 8, position 88b does not stop an object moving along surface path 23. Springs 92 provide sufficient spring force to overcome the unsupported weight of stop 88. Product stop assembly 81 is located beneath the surface path 23, except for the portion of stop 88 that extends above surface 23 when air cylinder 84 is in the retracted position.

Barrier 87 is fastened to top support 83. Barrier 87 has a smooth outer surface and a bottom surface 87a located within an ergonomically acceptable vertical height relative to top surfaces 66a and 56a. A vertical height of less than about four inches (101 mm) is adequate. This vertical height is approximately three and three eighths (86 mm) in this embodiment. Surface 87a is also located within an ergonomically acceptable vertical height relative to surface path 23. A vertical height of less than about four inches (101 mm) is adequate. In the preferred embodiment, this vertical height is approximately three inches (77 mm). Barrier 87 serves as a protective guard to prevent the operator or the operator's clothing or tools from being entangled or pinched within the moving portions of stop assembly 81.

As objects move along surface path 23, they are stopped by one or more product stop assemblies 81a and 81b, as depicted in FIG. 10. Downstream stop 81a stops an object upon which the operator performs work within the workstation area. Upstream stop 81b stops objects before they reach the operator, thus limiting the number of objects within the workstation area. It is possible that both stops 81a and 81b are within control of the human operator, thus permitting the operator control of the flow of objects through the workstation.

Variations of the product stop are possible. For example, the motion of member 85 could be at an angle relative to direction 200, rather than parallel as shown. As another example, stops 81a and 81b could be powered electrically or hydraulically, rather than pneumatically. It is possible to use other types of product stops. For example, a manually operated crossbar could be placed across path 23 to stop objects. As another example, a rotary actuator could be incorporated, actuating a stop plate by cam action. There are other variations in the type or configuration of product stop known to those of ordinary skill in the art that are encompassed within the present invention.

Figure 13:
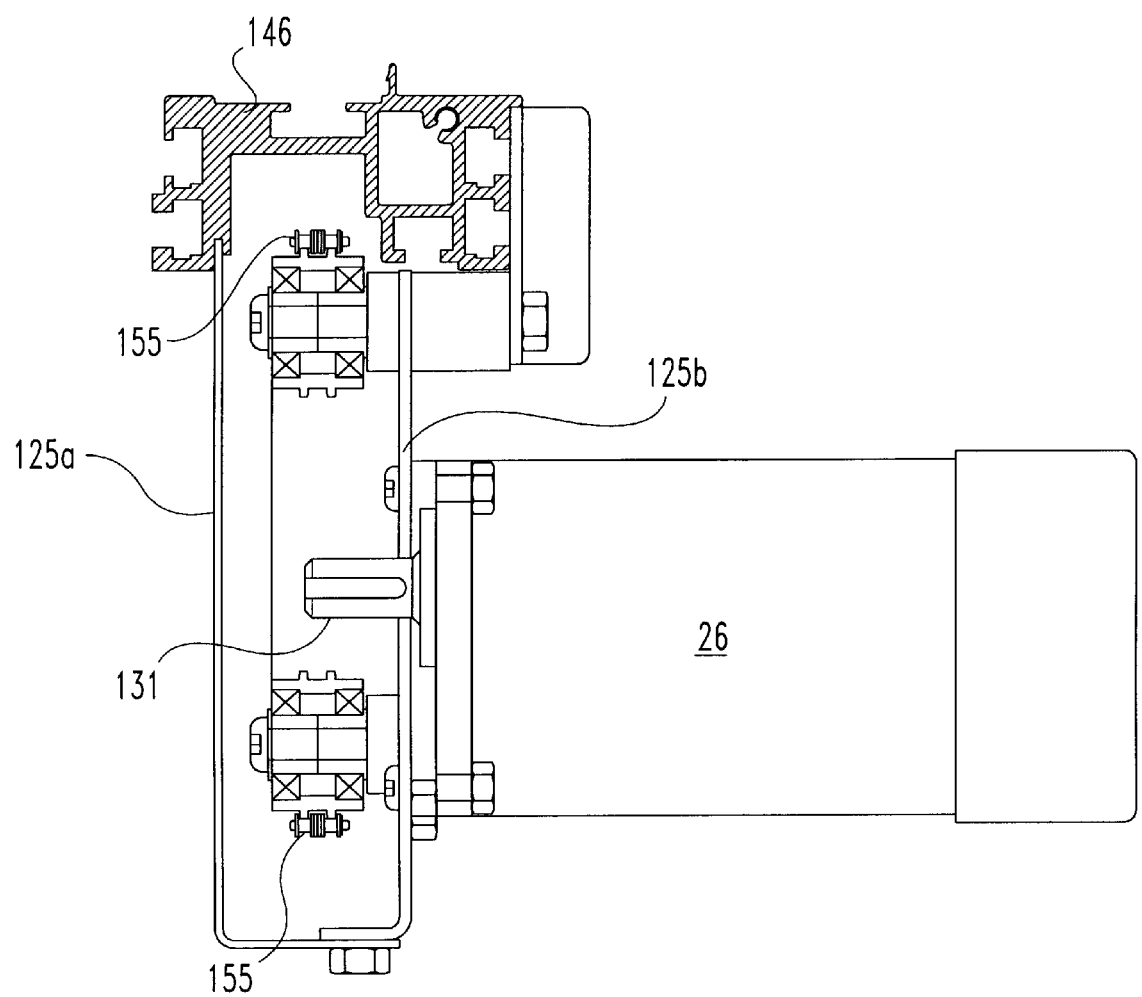
FIG. 13 is a view of FIG. 12 taken along line 13—13.

FIGS. 11–14 depict apparatus 120, a second embodiment of the present invention, in which the roller shafts are driven by chain rather than belt. Motor 26 drives toothed drive sprocket 135 which is engaged with and drives chain 155. Chain 155 is guided over a series of toothed idler sprockets 137 and toothed tensioning sprocket 136a, and past oiler mechanism 133. FIG. 13 depicts a cross section of FIG. 12 through line 13—13 with portions of conveying assembly 122 removed except for member 146, and with driving sprocket 135 removed. Panels 125a and 125b surround toothed sprockets 135, 136, and 137 and also portions of chain 155, thus protecting harmful or damaging contact between the operator and these portions of the drive mechanism. The size and placement of motor 26 restricts the permissible workstation area by reducing leg room underneath the conveying surface. For that reason, panels 125 form closely to the mechanisms enclosed therein.

The arrangement of the path of chain 155 over sprockets 135, 136a, and 137 is consistent with minimizing the intrusion of these components into the horizontal direction, thus maximizing the portion of conveyor 120 suitable as a workstation. Much of the path of chain 155 in the vicinity of motor 26 is oriented in the vertical direction. For example, idler sprockets 137a and 137b maintain adequate wrap around driving sprocket 135 and in approximately the same horizontal length as motor 26. Portion 155a of chain 155 from sprocket 137c is fed past and has lubricant applied by brush 133a of oiler mechanism 133, and wraps around tensioning sprocket 136a. Sprocket 136a is spring loaded and slidably engaged in track 136b. Idler sprockets 137a and 137b maintain adequate wrap of chain 155 around drive sprocket 135.

The brush of oiler 133 is approximately perpendicular to portion 155a of chain 155 between sprockets 137c and 136a. Track 136b is approximately parallel to portion 155a. Both chain portion 155a and track 136b are angled approximately 15 degrees from vertical, resulting in the brushes being approximately 15 degrees from horizontal. This arrangement results in adequate flow of oil onto chain 155, and permits arrangement of track 136b so as to maintain brush contact to the chain through the complete path of sprocket 136a in slot 136b while tensioning the chain.

Note that motor 26 is not enclosed in apparatus 120. Apparatus 120 does not include a confined volume that is evacuated, and for that reason motor 26 need not be enclosed within panels 125a or 125b. However, it is possible for motor 26 to be so enclosed in apparatus 120. It is also possible for motor 26 of apparatus 20 to not be enclosed if it is not necessary to create evacuated confined volume 29. An evacuated confined volume is an option for either apparatus 20 or 120.

Figure 11:
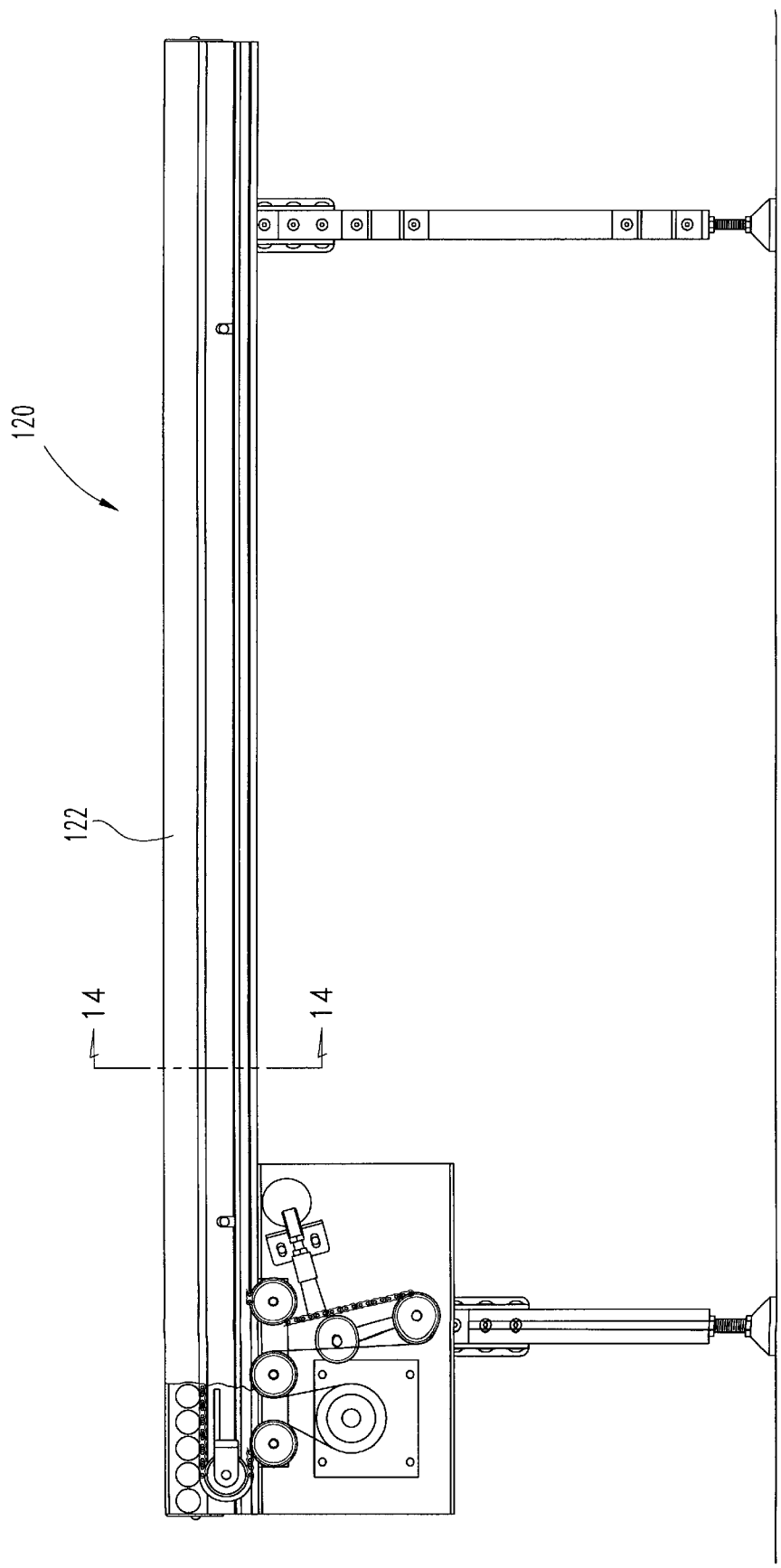
FIG. 11 is a side view of a second embodiment of the present invention, with some covers partially cut away and some portions in sectional view.
Figure 12:
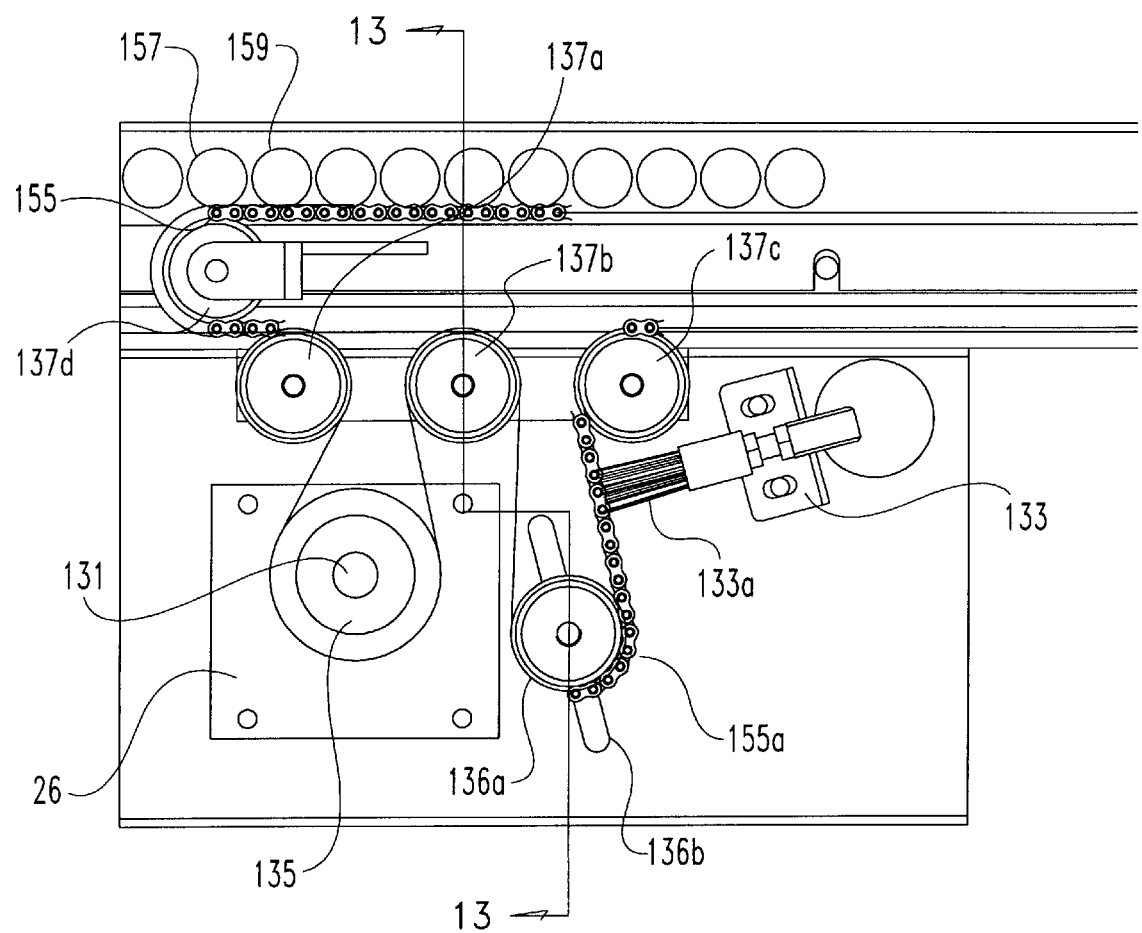
FIG. 12 is an enlarged view of FIG. 11 in the vicinity of motor 26.
Figure 14:
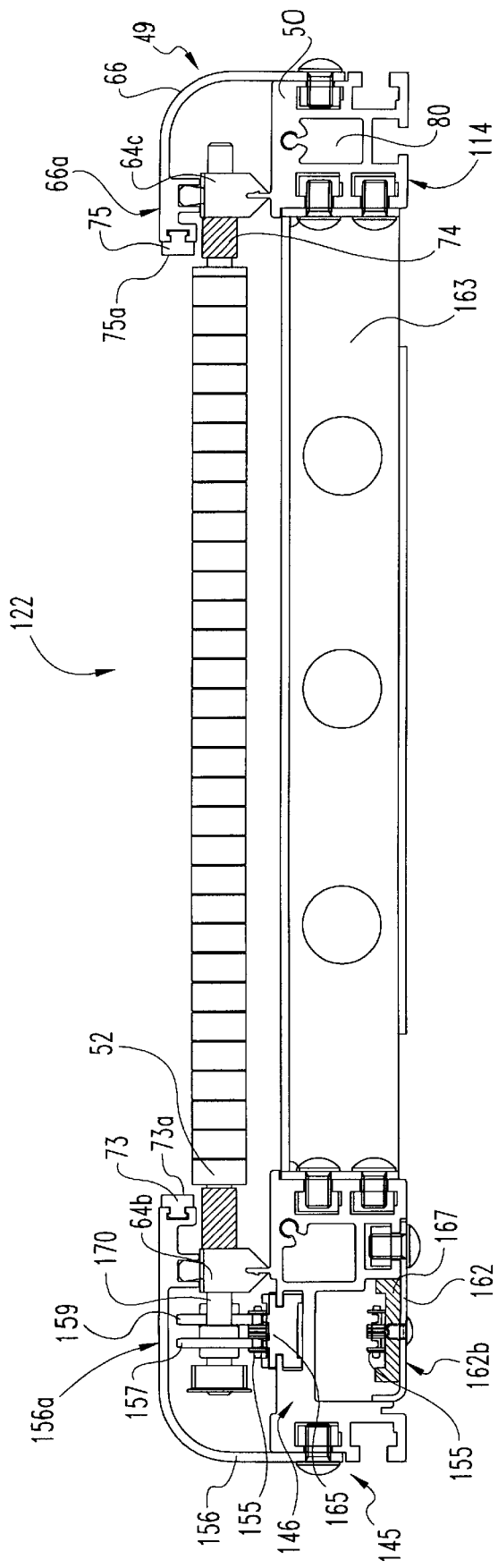
FIG. 14 is a view of FIG. 11 taken along line 14—14, showing conveying assembly 122.

FIG. 14, a cross section of FIG. 11 taken along line 14—14, depicts conveying assembly 122, a portion of apparatus 120 similar to conveying assembly 22. Assembly 122 includes roller shaft driving assembly 145 and roller shaft support assembly 49. Note that support assembly 49 is capable of rotatably receiving shafts driven by either of driving assemblies 45 or 145.

Toothed sprockets 157 and 159 are attached to shafts 170. Chain 155 drives a plurality of left side drive sprockets 157 and a plurality of right side drive sprockets 159. Sprockets 157 and 159 are arranged on shafts 170 in an alternating manner. This alternating manner is depicted in FIG. 14, where sprocket 159, attached to its own shaft 170, appears behind sprocket 157 attached to its own shaft 170. Sprockets 157 and 159 are placed at different axial positions along their respective shafts 170, thus permitting sprockets 157 and 159 to be larger in diameter and not interfere with each other.

Chain 155 slides along track insert 165, which in turn is supported by side member 146. Member 146 is supported vertically from the floor in a manner similar to that of member 46. A length of chain 155 is also supported by chain return guide 167. Guide 167 is attached to bottom cover 162, cover 162 being fastened to member 146. Cover 156 also attaches to member 146, and includes a pocket in which bushing holder 64b is located. Cover 156 also includes a pocket in which guide rail 73 is inserted.

Roller shafts 170 frictionally drive a plurality of slippable rollers 52 as described in the '982 and '255 patents. Bushing holders 64b rotatably support shafts 170 near sprockets 157 and 159, and bushing holders 64c rotatably support shafts 170 relative to cover 166 and side rail member 150. Objects are moved along surface path 23, which extends across the tops of rollers 52. Bulkhead 163 structurally connects driving assembly 145 to support assembly 49.

The driving mechanism of apparatus 120 includes chain 155, toothed sprockets 135, 136a, 137, 156, and 157, motor 26, and roller shafts 170. Although specific features of the driving mechanism are described, the present invention includes equivalents known to those of ordinary skill in the art.

The present invention includes an enclosure of the driving mechanism. The enclosure protects the human operator by enclosing those mechanisms that could pinch, abrade, grab or otherwise bring damage or injury to the clothing, tools, or extremities of the operator. Within the workstation area of apparatus 120, the human operator is protected from the driving mechanism by the enclosure, which includes covers 156 and 162, and member 146. These elements extend for the length of the workstation area, and do not present openings through which the operator is exposed to moving parts. Covers 156 and 162 and member 146 are smooth and rounded where possible. Fasteners are also smooth and rounded, preferably of the buttonhead variety.

Bottom surface 162b, and also portions of the bottom of member 146, are in proximity to the legs and other portions of the operator. Surface 156a of cover 156 is in proximity to the arms and other portions of the operator. The vertical height from surface 162b to surface 156a is compatible with anthropometric considerations. When conveyor legs 24a and 24b are adjusted so that surface 162b has sufficient clearance relative to the legs of the operator, surface 156a is at a height compatible with the operator's arms. A vertical height between top and bottom surfaces of about four inches (101 mm) or less is considered adequate. The embodiment shown in FIG. 14 has a vertical height of approximately three and one eighth inches (80 mm).

Figure 15:
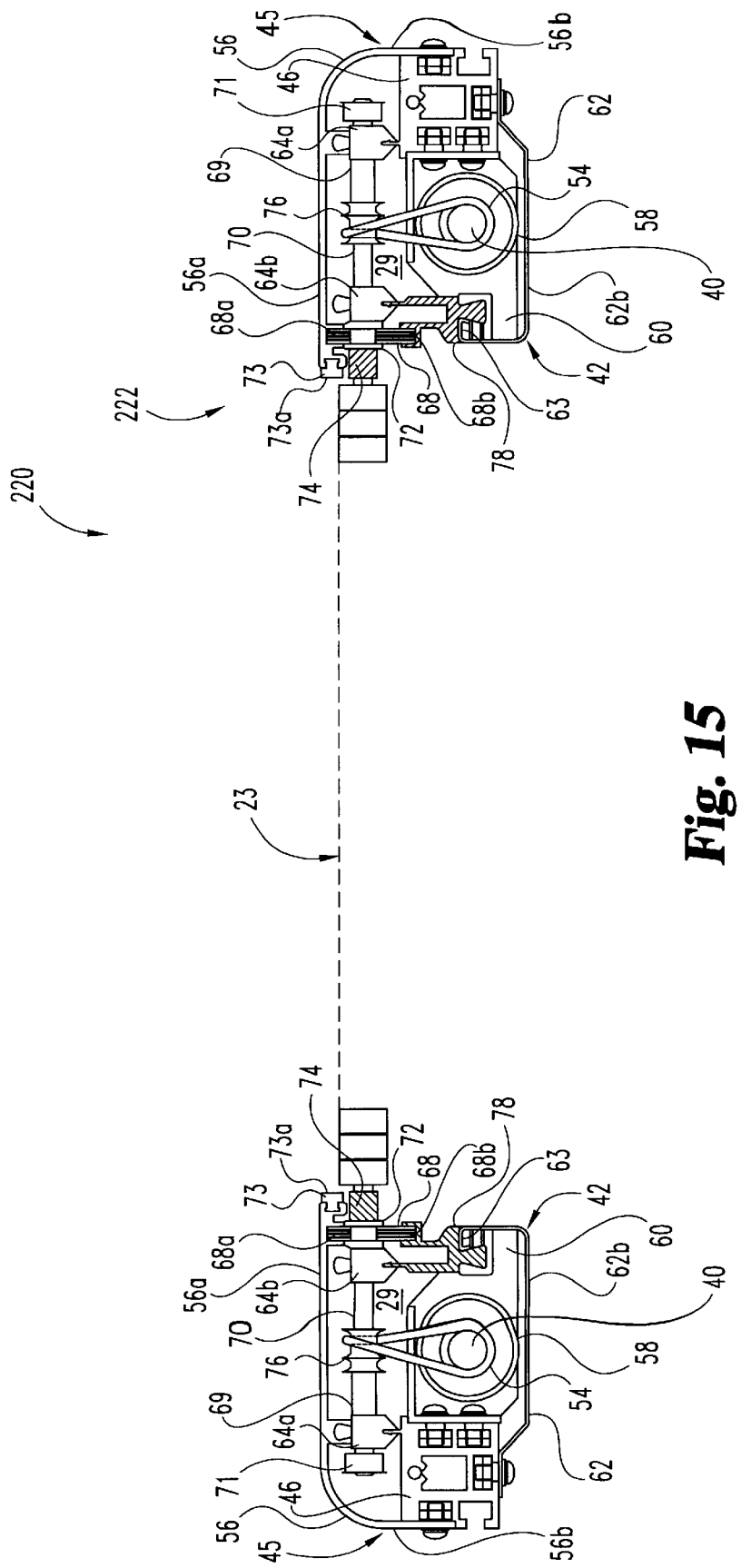
FIG. 15 is a sectional view of a portion of a third embodiment of the present invention.
Figure 16:
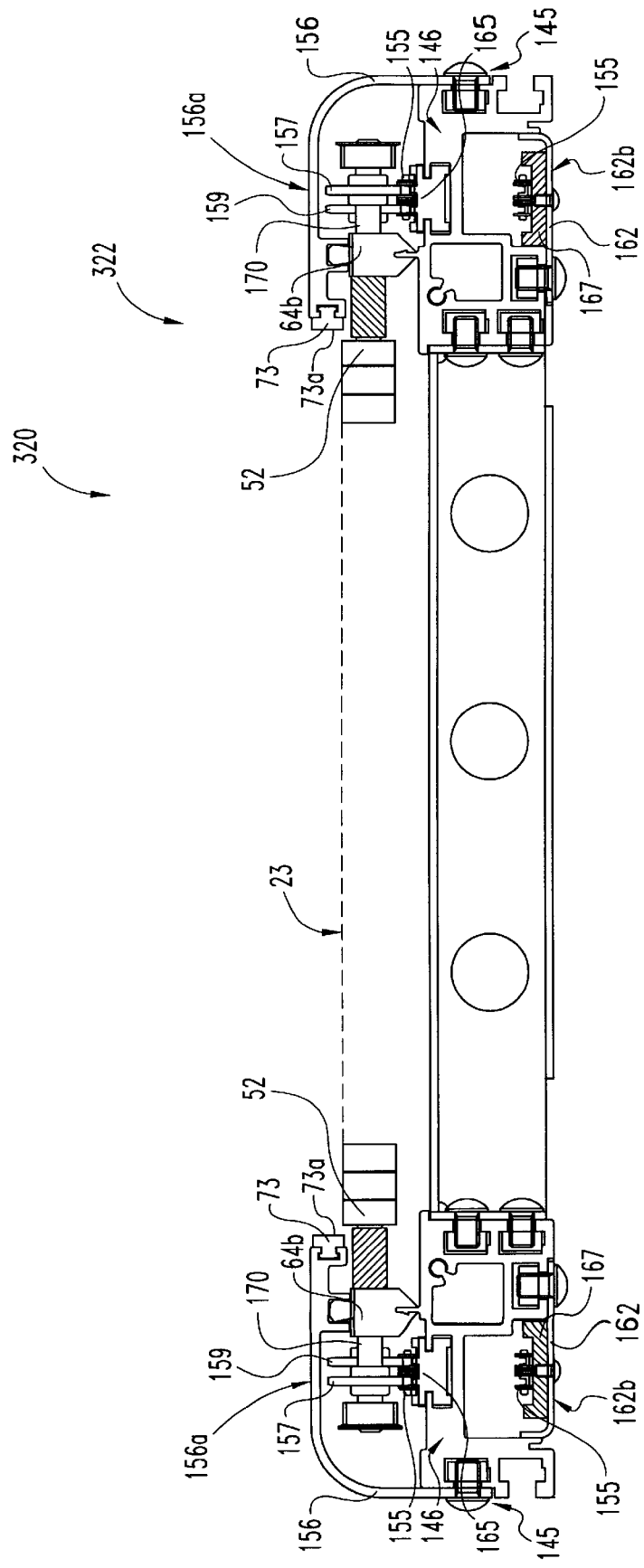
FIG. 16 is a sectional view of a portion of a fourth embodiment of the present invention.

FIGS. 15 and 16 show the third and fourth embodiments, respectively, of the present invention. Both the third and fourth embodiments incorporate a moving surface path 23 that is largely open in the center, and supported by rollers 52 along the edges of path 23. This open track feature is less disruptive to the flow of air around the conveyor, which may be important in some applications.

FIG. 15 shows a third embodiment in which two roller driving assemblies 45 are part of conveying roller assembly 222 atop conveyor assembly 220. Each driving assembly 45 drives a small number of rollers 52. A transfer mechanism (not shown) provides power to each driving assembly 45 from motor 26.

FIG. 16 shows a fourth embodiment in which two roller driving assemblies 145 are part of conveying roller assembly 322 atop conveyor assembly 320. Each driving assembly 145 drives a small number of rollers 52. A transfer mechanism (not shown) provides power to each driving assembly 145 from motor 26.

Although specific elements of the first enclosure have been described, the first and second enclosures encompass equivalents known to those of ordinary skill in the art. For example, covers 156 and 162 could be made to complete enclose member 146, or covers 162 and 156 could each be made in multiple pieces. Product stop assembly 81 is useful with any of the embodiments.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for conveying objects, the apparatus being part of a workstation for a seated human operator, the apparatus comprising:

a plurality of roller shafts;

a plurality of slippable rollers driven by said roller shafts, said rollers defining a surface path for conveying objects;

a driving mechanism including a drive shaft for driving said roller shafts, said driving mechanism having a bottom;

a first member along the bottom of said driving mechanism for protection of the legs of the seated operator from said drive shaft;

a product stop located underneath the surface path and in front of the seated operator, said product stop including an actuator operable for stopping an object on the surface path in front of the seated operator, said product stop having a bottom; and a second member along the bottom of said product stop for protection of the legs of the seated operator from the operation of said actuator.

2. The apparatus of claim 1 wherein said roller shafts have a non-driven end, and which further comprises a roller shaft support for receiving the non-driven end of said roller shafts, said roller shaft support having a top and a bottom with a horizontal distance therebetween of less than about four inches.

3. The apparatus of claim 1 wherein said first member and said second member have smooth outer surfaces so as to not snag the clothing covering the legs of an operator.

4. The apparatus of claim 1 wherein the distance from the centerline of one said roller shaft to the centerline of said drive shaft is less than about two and two-thirds inches.

5. The apparatus of claim 4 which further comprises a plurality of friction drive belts for frictionally driving said roller shafts from said drive shaft, wherein said drive belts each have a length and the length is less than about six and one half inches.

6. The apparatus of claim 5 wherein said first drive shaft has an outer diameter and the outer diameter is less than about one inch.

7. The apparatus of claim 1 wherein the object remains in contact with a plurality of slippable rollers after being stopped by said product stop.

8. The apparatus of claim 1 wherein said driving mechanism has a top and an outer side surface, said first member has a bottom surface, and said surface path has a boundary, and the vertical distance from the top of said driving mechanism to the bottom surface of said first member is less than about four inches, and the horizontal distance from the outer side surface of said driving mechanism to the boundary is less than about six and one-third inches.

9. The apparatus of claim 8 wherein the vertical distance is less than three and one-half inches and the horizontal distance is less than about five inches.

10. The apparatus of claim 1 wherein said driving mechanism defines a confined volume, and which further comprises an evacuator of said confined volume.

11. The apparatus of claim 1 wherein said actuator has a direction of movement, and the direction of movement is parallel to the plane of the surface path.

12. The apparatus of claim 11 wherein said product stop includes a stopping member extendable through the surface path from below the surface path by operation of said actuator to stop an object being conveyed, said stopping member being retractable to below the surface path to release the object.

13. A method for a seated human operator to work on objects, the method comprising:

providing a powered conveyor, the conveyor including a driving mechanism, a plurality of roller shafts, a plurality of slippable rollers for conveying objects, and a product stop, the rollers being driven by the roller shafts, the roller shafts being driven by the driving mechanism, the rollers defining a surface path along which the objects are conveyed, at least a portion of the driving mechanism being enclosed to protect the legs of a human operator sitting with legs underneath at least some of the slippable rollers, the product stop being underneath the surface path;

conveying the objects by the slippable rollers along the surface path;

stopping a first object by the product stop in front of the seated operator and over the legs of the seated operator;

keeping the object in contact with a plurality of slippable rollers while the object is stopped; and enclosing the product stop for protection of the legs of the operator.

14. The method of claim 13 which further comprises providing power to rotate the roller shafts driving the shippable rollers in contact with the first object while the object is stopped.

15. The method of claim 13 which further comprises performing work by the seated operator during said keeping.

16. An apparatus for conveying objects, the apparatus comprising:

a plurality of roller shafts;

a plurality of slippable rollers driven by said roller shafts, said rollers defining a surface path along which the objects are conveyed;

a driving mechanism for driving at least a portion of said roller shafts, said driving mechanism having a top and a bottom;

a first member along the bottom of said driving mechanism for the protection of an operator sitting with legs underneath the surface path;

a product stop for stopping an object on the surface path in front of the seated operator, said product stop being located underneath the surface path and in front of the seated operator, said product stop having a bottom; and a second member along the bottom of said product stop for protection of the legs of the seated operator from the operation of said product stop;

wherein the vertical distance from the surface path to the bottom of said second member is less than about four inches, and the vertical distance from the top of said driving mechanism to the bottom of said first member is less than about four inches.

17. The apparatus of claim 16 wherein said driving mechanism has an outer side surface, said surface path has a boundary, and the horizontal distance from the outer side surface of said driving mechanism to the boundary is less than about six and one-third inches.

18. The apparatus of claim 17 wherein the vertical distance from the surface path to the second member is less than about three and one half inches, and the vertical distance from the top of said driving mechanism to the first member is less than about three and one half inches.

19. The apparatus of claim 16 wherein said first member and said second member have smooth outer surfaces so as to not snag the clothing covering the legs of an operator.

20. The apparatus of claim 16 wherein said driving mechanism defines a confined volume, and which further comprises an evacuator of said confined volume.

21. The apparatus of claim 16 wherein said actuator has a direction of movement, and the direction of movement is parallel to the plane of the surface path.

22. The apparatus of claim 16 wherein said product stop includes a stopping member extendable through the surface path from below the surface path by operation of said actuator to stop an object being conveyed, said stopping member being retractable to a position below the surface path to release the object.

23. The apparatus of claim 16 wherein said roller shafts have a non-driven end, and which further comprises a roller shaft support for receiving the non-driven end of said roller shafts, said roller shaft support having a top and a bottom with a horizontal distance therebetween of less than about four inches.

24. The apparatus of claim 1 which further comprises a plurality of friction drive belts for frictionally driving said roller shafts from said drive shaft.

25. The method of claim 14 which further comprises performing work by the seated operator during said keeping.

26. The apparatus of claim 16 wherein said driving mechanism comprises a plurality of friction drive belts for frictionally driving said roller shafts from a drive shaft.

* * * * *